May 24, 1966

J. L. CLARREN ETAL 3,252,266

ARTICLE WRAPPING APPARATUS

Filed Jan. 10, 1963

INVENTORS
J. L. CLARREN
L. R. HAGNER
BY
a.c. Schwarz, Jr.
ATTORNEY

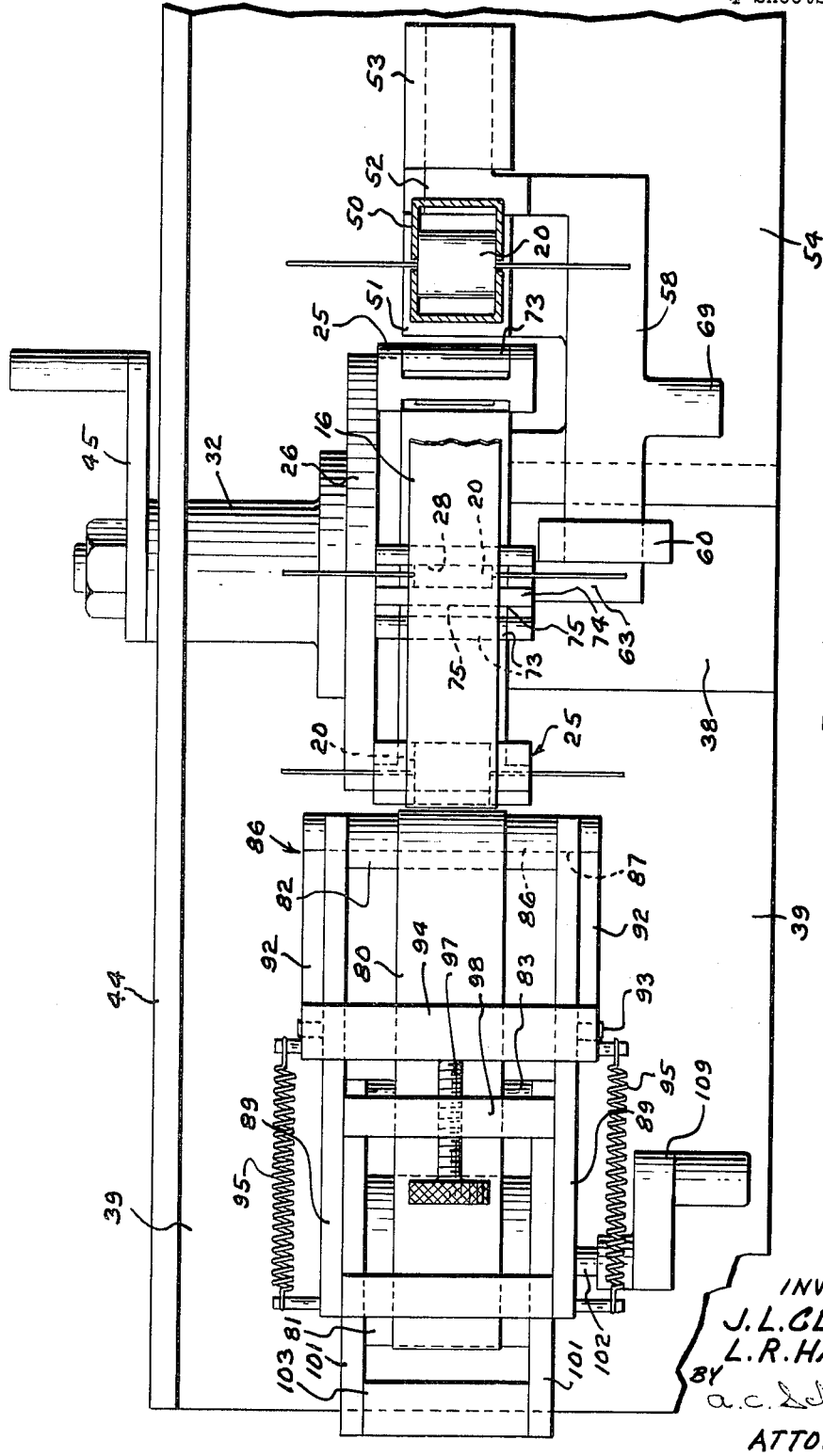

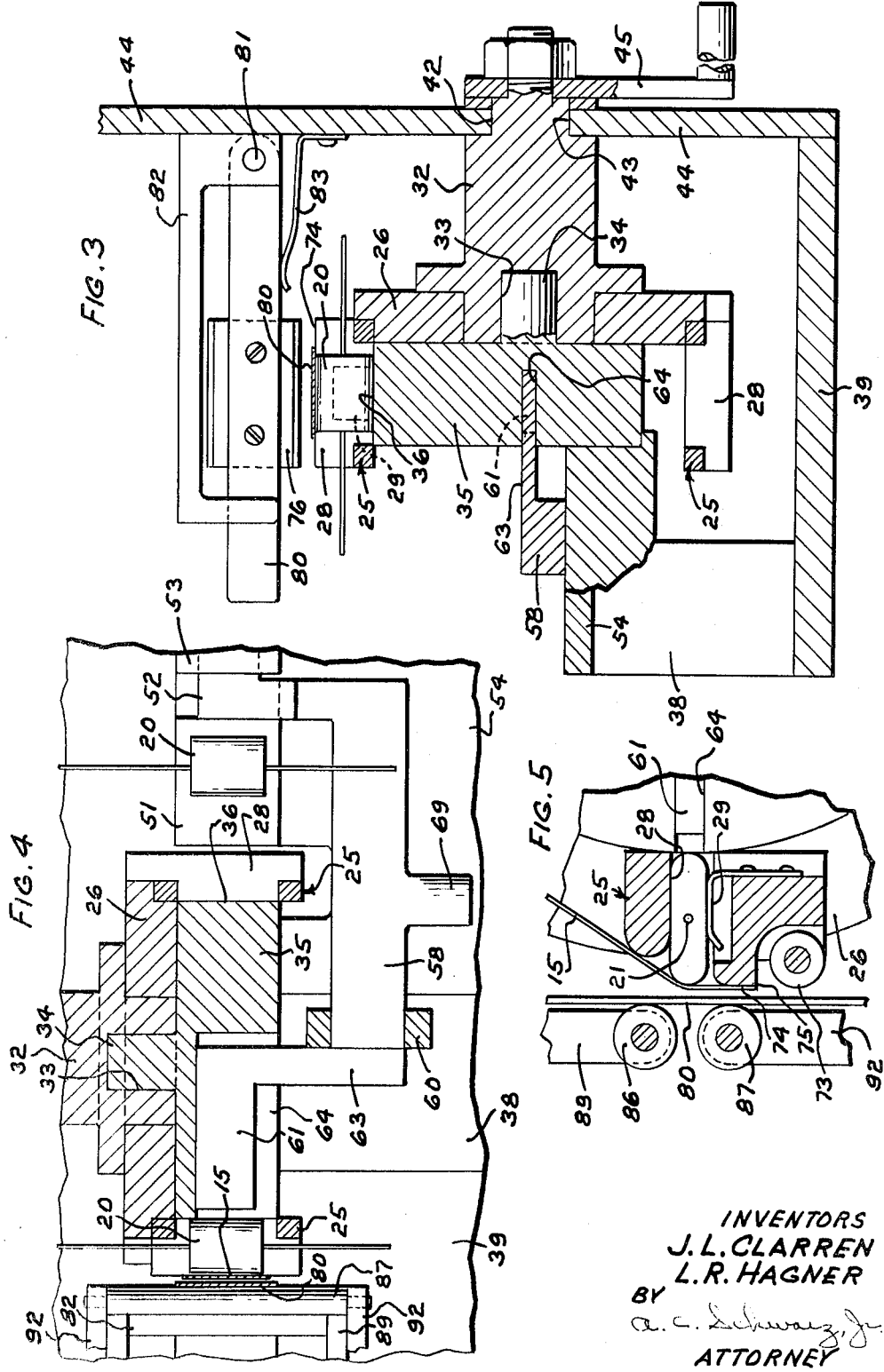

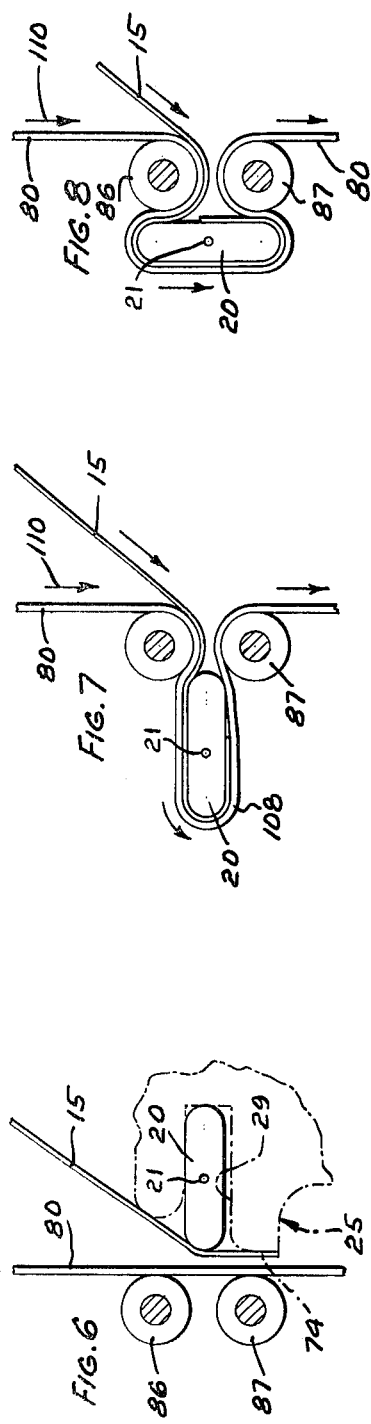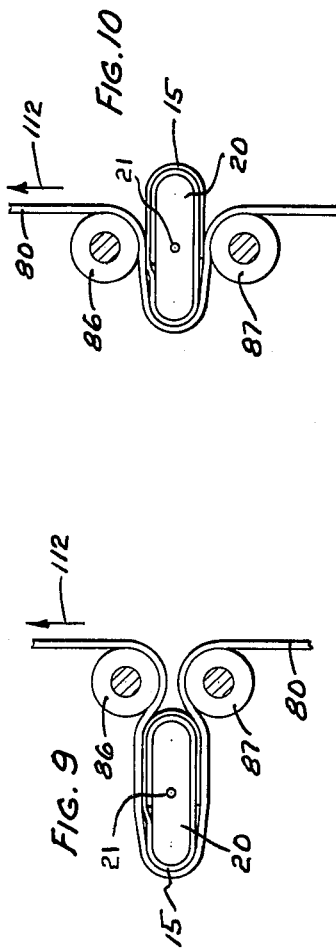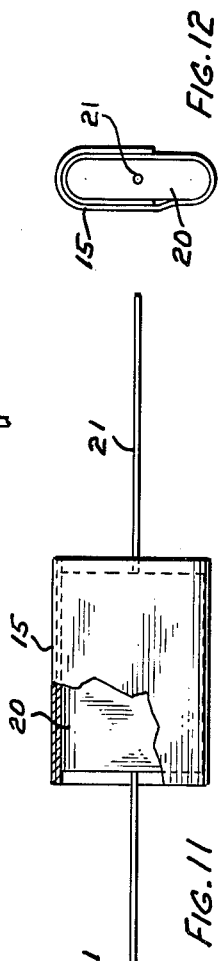

United States Patent Office 3,252,266
Patented May 24, 1966

3,252,266
ARTICLE WRAPPING APPARATUS
John L. Clarren, Chicago, and Lawrence R. Hagner, Cicero, Ill., assignors to Western Electric Company, Incorporated, New York, N.Y., a corporation of New York
Filed Jan. 10, 1963, Ser. No. 250,525
9 Claims. (Cl. 53—215)

This invention relates to an article wrapping apparatus, and more particularly to an apparatus for shearing sections of adhesive tape and wrapping them around capacitors.

An object of the present invention is to provide an effective and efficient apparatus for wrapping articles.

Another object of the invention is to provide a novel apparatus for shearing sections from strips of adhesive coated material and wrapping them around capacitors.

An apparatus illustrating certain features of the invention may include a rotary carrier having a plurality of spaced holders for receiving articles therein at a loading station. The carrier is intermittently actuated to advance the holder and the article into engagement with the tacky side of a supply strip of adhesive tape. At a second station a cutter is actuated to shear the tape against the holder to sever a section of tape with the trailing end of the section adhering to the holder and with the leading end of the section adhering to the article in the preceding holder. Such article with the leading end of the section of the adhesive strip adhering thereto is disposed in a wrapping station and is positioned adjacent to an endless belt and a pair of spring loaded loop-forming rollers of a wrapping device of the apparatus.

A pusher is actuated to push the article and the tape section from the holder against the belt causing the article and the belt to separate the rollers and advance between and onto the other side of the rollers and causing the belt to form a loop encircling the article and a portion of the tape. The belt which is held taut by a spring urged belt tightener is then driven in one direction to effect the rotation of the article within the loop of the belt and the wrapping of the section of adhesive tape around the article. Thereafter, the belt is driven in the reverse direction to effect the withdrawal of the loop of the belt and the wrapped article from between the rollers as one portion of the belt on one side of the loop is advanced in such reverse direction, and the portion of the belt on the other side of the loop is yieldably held against movement by the belt tightener.

Other objects, advantages and novel aspects of the invention will become apparent upon consideration of the following detailed description, in conjunction with the accompanying drawings, in which:

FIG. 2 is a fragmentary plan sectional view of the apparatus taken on line 2—2 of FIG. 1;

FIG. 3 is a fragmentary vertical cross-sectional view of the apparatus taken on the line 3—3 of FIG. 1;

FIG. 4 is a fragmentary plan sectional view of the apparatus taken on the line 4—4 of FIG. 1 and showing the pusher mechanism for loading an article into the carrier at one station and for transferring an article from the carrier into a wrapping device at a wrapping station;

FIG. 5 is an enlarged fragmentary vertical sectional view through the apparatus at the wrapping station;

FIGS. 6–10 are fragmentary diagrammatic views of a portion of the apparatus at the wrapping station showing successive stages of the wrapping of the adhesive tape about an article; and FIGS. 11 and 12 are side and end views, respectively, of the article.

Figure 1:
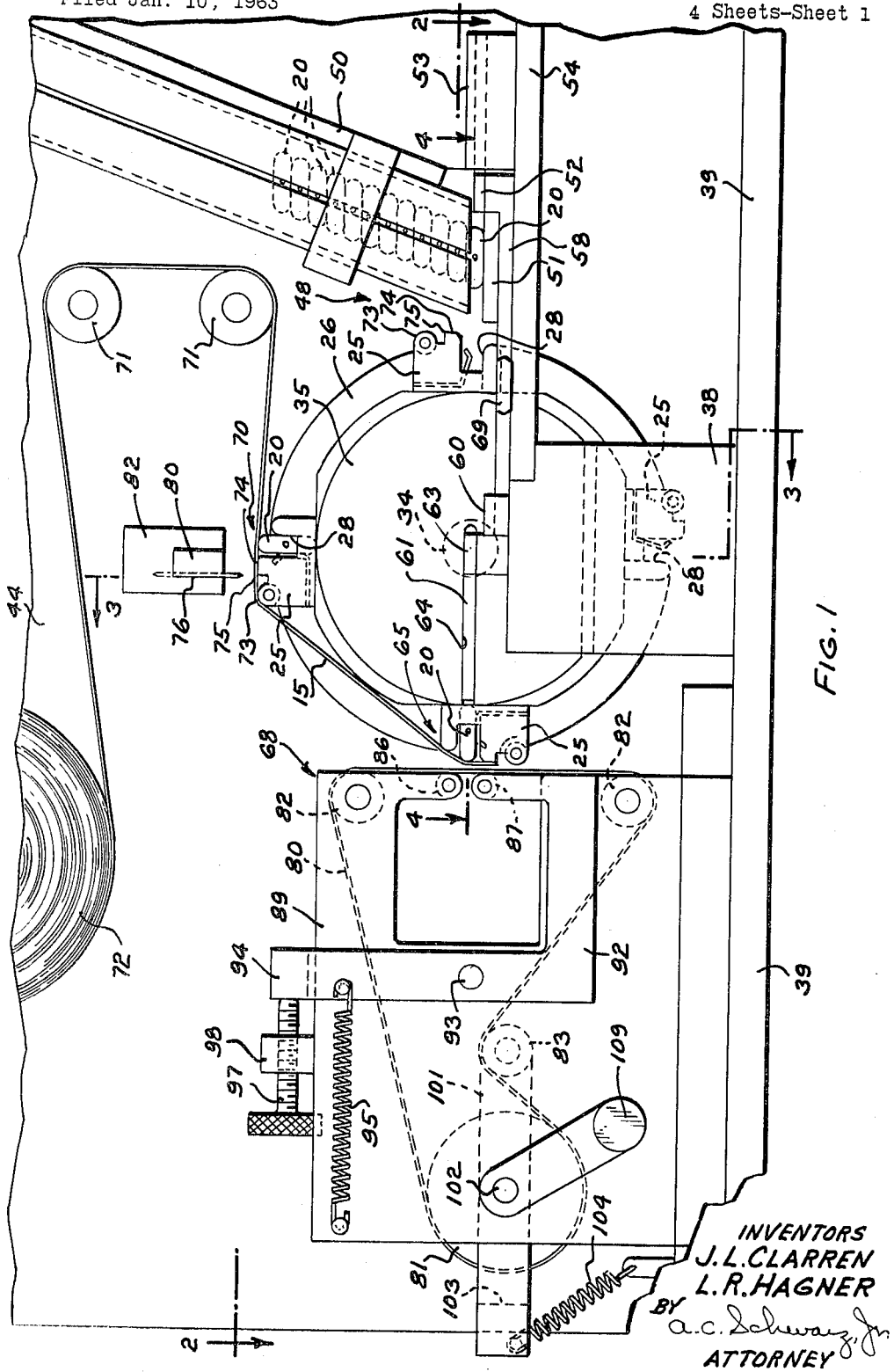
FIG. 1 is a fragmentary front elevational view of the article wrapping apparatus embodying the present invention.

Referring to the drawings, the apparatus is designed to sever a section 15 from a strip or tape 16 of dielectric material having adhesive applied to one side thereof and to wrap the section of adhesive tape around an article 20 in the form of a wound, flattened capacitor having leads 21 extending from opposite ends thereof. The section of adhesive tape is wider than the capacitor 20 is long and is wound on the capacitor with the edges of the adhesive tape extending beyond the ends of the capacitor as shown in FIG. 11.

The apparatus comprises a plurality of four article holders 25 mounted on a rotary carrier 26 for rotation therewith about a horizontal axis. The holders 25 extend laterally from the carrier in predetermined spaced relation to each other and each has a radially disposed slot 28 for receiving an article 20 therein and has a leaf spring 29 secured thereto for yieldably retaining the article therein. As shown in FIG. 3, the rotary carrier 26 has a hub 32 which is provided at one end with a bearing recess 33 for receiving a trunnion 34 on which it is rotatably supported.

The trunnion 34 is formed on a stationary member 35 which is positioned within the circular path of movement of the holders 25 and has a cylindrical surface 36 cooperable with the holder 25 for supporting the articles in predetermined positions therein. The stationary member 35 is attached to an L-shaped support 38 that is mounted on a horizontal frame plate 39. At its other end the hub 32 of the carrier 26 has a reduced portion 42 journalled for rotation in a bearing aperture 43 of a vertical frame plate 44 secured to and extending upwardly from the horizontal frame plate 39. A crank 45 is secured to one end of the hub 32 by means of which the carrier 26 may be intermittently rotated to advance the holders 25 to successive stations of the apparatus.

At a loading station 48 of the apparatus (FIG. 1), a supply of the articles 20 are supported in an oblique row in a magazine 50 with the lowermost capacitor 20 supported on a platform 51 in horizontal alignment with the slot 28 of a holder 25 positioned at the loading station. The lowermost capacitor 20 of the row is also positioned in the path of a horizontally movable pusher 52, a portion of which is supported in a guideway of a guide 53. The guide 53 is mounted on a horizontal supporting plate 54 that is secured to and extends laterally from the support 38. The pusher 52 is secured to one end of a U-shaped slide 58 supported on the horizontal plate 54 and guided for horizontal reciprocatory movement by the guide 53 and a guide 60 on the vertical support 38.

As shown in FIGS. 1 and 4, a second pusher 61 is secured by a laterally extending arm 63 to the other end of the slide 58 for reciprocatory movement therewith and the pusher member 52. The pusher 61 is mounted in a slot 64 in the stationary member 35 in alignment with the slot 28 of a holder 25 positioned at a wrapping station 65 adjacent to a wrapping device 68. Reciprocatory movement is imparted to the slide 58 and the pushers 52 and 61 by means of a handle 69 on the slide to effect the simultaneous transfer of an article 20 from the magazine 50 to a holder 25 at the loading station 48 and the transfer of an article with a section 15 of tape adhering thereto from the holder 25 at the wrapping station 65 into the wrapping device 68 as will be described in more detail hereinafter.

After the loading of an article 20 into the holder 25 at the loading station 48, the carrier 26 is indexed a quarter turn to advance the holder 25 and the article 20 thereon from the loading station to a second or intermediate station 70 (FIG. 1), during which movement the holder 25 and the article 20 therein are brought into engagement with the tacky side of the adhesive tape 16. As indicated in FIG. 1, the tape 16 is advanced around guide rollers 71 from a supply roll 72 of the tape which is suitably supported on the vertical frame plate 44.

Each of the holders 25 is provided with a pair of tape engaging surfaces 73 and 74 positioned in advance of the article 20. The tape supporting surface 73 is preferably in the form of a roller rotatably supported on the holder, and the supporting surface 74 is formed by a flat outer surface of the holder having a shearing edge 75 along one edge thereof.

At the intermediate station 70 a movable shear blade 76 is provided for shearing the tape against the shearing edge 75 of the holder 25 to sever a section 15 from the adhesive tape 16 with the severed section 15 adhering at its leading end to the supporting surface 74 of the holder 25 and onto the article 20 therein at the wrapping station 65 and with its trailing end adhering onto the roller 73 of the holder 25 at the intermediate station 70. The shear blade 76 is in the form of a razor blade removably secured to a lever 80 that is pivotally supported on a fixed pivot 81 of a supporting bracket 82 and is urged to a normal upper position by a leaf spring 83 mounted on the vertical frame plate 44.

As best shown in FIG. 1, the wrapping device 68 comprises a flexible endless belt 80 supported for movement on a driving drum 81, a pair of idler rollers 82 and a belt tightening roller 83, and engageable with a pair of loop-forming rollers 86 and 87. The loop-forming rollers 86 and 87 are disposed in parallel relation to each other adjacent the path of movement of the belt and adjacent to an article 20 supported in a holder 25 in the wrapping station 65. The driving drum 81, the idler rollers 82 and the upper loop-forming roller 86 are supported for rotation about fixed axes in a pair of vertically disposed frame plates 89 secured to and extending upwardly from the horizontal frame plate 39.

The lower loop-forming roller 87 is rotatably supported in one end of each of a pair of J-shaped arms 92 which are supported on the vertical frame plates 89 for pivotal movement about a fixed axis 93 and are interconnected at their upper ends by a cross bar 94. Springs 95 urge the arms 92 in a counterclockwise direction as viewed in FIG. 1, to move the movable loop-forming roller 87 to a predetermined normal position adjacent to the fixed loop-forming roller 86 with the peripheries thereof spaced apart a predetermined distance less than the width of the article 20. A set screw 97 is adjustably supported in a member 98 extending between the vertical frame plates 89 for stopping the arms 92 with the movable loop-forming roller 87 in such normal position.

Sufficient slack is provided in the belt to allow for the formation of a loop thereof around the article 20 to effect the wrapping of the section 15 of tape around the article during the wrapping operation. The belt tightening roller 83 is rotatably supported between the ends of a pair of arms 101 that are mounted for pivotal movement on a shaft 102 secured to the driving drum 81. At their other ends the arms 101 are interconnected by a cross bar 103 for movement together and the arms are connected to springs 104 for urging the belt tightener roller 83 in a counterclockwise direction as viewed in FIG. 1 to maintain the belt 80 taut.

Attention is now directed to FIG. 1 of the drawings which shows the apparatus in one position with a holder 25 and an article 20 therein in the intermediate station 70 in engagement with the adhesive tape 16 and with the preceding holder 25 and the article 20 therein at the wrapping station 65 with the leading end of the tape adhering thereto. The shear blade 76 is then actuated to shear the adhesive tape 16 and sever the section 15 therefrom with the trailing end of the tape section 15 adhering to the roller 73 of the holder 25 at the station 70 and the leading end of the tape section 15 adhering to the article 20 and the supporting surface 74 of the holder 25 at the wrapping station 65. The slide 58 is then actuated to cause the pusher 52 to effect the transfer of an article 20 from the magazine 50 to the holder 25 at the loading station 48 and to cause the pusher bar 61 to advance an article 20 from the holder 25 at the wrapping station 65 into the wrapping device 68.

As the pusher 61 advances from the position shown in FIGS. 1 and 6, it pushes the article 20 with the section 15 of the tape adhered thereto aginst the portion of the belt disposed between the loop-forming rollers 86 and 87 and causes the article 20 and the belt 80 to move the roller 87 downwardly from the roller 86 and to advance horizontally with the section 15 of the tape between the rollers 86 and 87 and onto the other side of the rollers and cause a portion of the belt to form a loop 108 encircling the article 20 and a portion of the section 15 of the tape as shown diagrammatically in FIG. 7. Thereafter, the driving drum 81 is rotated in a clockwise direction (FIG. 1) by means of a crank 109 to drive the belt in one direction as indicated by the arrows 110 in FIGS. 7 and 8 to cause the loop 108 of the belt to effect the rotation of the article 20 therein and the wrapping of the section 15 of adhesive tape around the article as indicated diagrammatically at different stages of the operation in FIGS. 8 and 9.

Upon completion of the wrapping of the section 15 of tape around the article, the carrier 26 is indexed 45° to provide clearance for the ejection of the wound article 20 from the wrapping device 68. Thereafter, the winding drum 81 is rotated in the reverse or counterclockwise direction to effect the movement of the portion of the belt extending above the loop 108 and the roller 86 in an upward direction as indicated by the arrow 112 (FIGS. 9 and 10) while the belt tightener roller 83 under the influence of springs 104 applies tension to the portion of the belt extending below the loop 108 and roller 87 which prevents movement of this portion of the belt. The upward movement of the portion of the belt on the upper side of the loop 108 relative to the portion of the belt on the lower side of the loop causes the withdrawal of the looped portion 108 of the belt from between the rollers 86 and 87 (FIG. 10) and the ejection of the wrapped article 20 from the wrapping device.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. In an article wrapping apparatus the combination of a flexible belt:
   means including a pair of members for supporting the belt for longitudinal movement along a predetermined path and along one side of said members, one of said members being mounted for movement away from the other member from a normal position spaced from the other member a distance which is less than the thickness of the article to be wrapped;
   yieldable means for urging said movable member to said normal position;

means for moving an article and a strip to be wrapped therearound against said belt and between said members to cause the article and a portion of said belt to be carried to the opposite side of said members and to cause a loop to be formed in said belt around the article and said loop and the article to be supported by said members for rotation about an axis through the article;

means for selectively moving said belt longitudinally to effect the rotation of the article and the strip within said loop and the wrapping of the strip around the article in response to movement of the belt in one direction; and means responsive to movement of the belt in the reverse direction to effect the withdrawal of the loop and the article therein from between said members.

2. In an article wrapping device the combination of:

a pair of rollers mounted in laterally spaced relation to each other for movement of one roller relative to the other;

resilient means for urging said movable roller toward the other to a normal position with the rollers spaced apart a predetermined distance which is less than the width of the article to be wrapped;

a belt mounted for longitudinal movement along one side of said rollers;

means for moving an article with one end of a strip adhered thereto against said belt and between said rollers to the opposite side of said rollers to cause a loop to be formed in the belt around the article as the article passes between the rollers and to cause the loop and the encircled article to be supported by said rollers for rotation about an axis through the article;

means for selectively moving said belt longitudinally; and yieldable means for maintaining said belt taut to effect the wrapping of the strip around the article by the loop of said belt in response to movement of said belt in one direction and to apply tension to one portion of said belt on one side of the loop as the portion of said belt on the other side of said loop is moved away from said one portion to effect the withdrawal of the loop and the article from between said pair of rollers in response to movement of said belt in the opposite direction.

3. A device for wrapping a strip around an article which comprises:

an endless belt;

means for supporting said belt for longitudinal movement along a predetermined path;

a pair of members mounted adjacent to and on one side of the path of travel of the belt and biased for movement of one member toward the other to a normal position with a predetermined gap between said members which is less than the width of the article to be wrapped;

means for moving an article and a portion of a strip against said belt and through the gap between said members to the other side of said members to cause said belt to form a loop around the article and a portion of the strip on the other side of said members and to be supported by said members for rotation about an axis through the article;

a selectively driven drum for moving said belt longitudinally to effect the rotation of the article and the strip within the loop and the wrapping of the strip around the article in response to movement of said belt in one direction; and a belt tightening element biased for rotation about said drum to maintain said belt taut and operable in response to movement of said belt in the reverse direction to apply tension to a portion of said belt on one side of said loop and to hold said portion against movement as the portion of said belt on the other side of said loop is moved to effect the withdrawal of said loop and the article therein from between said members.

4. An article wrapping apparatus comprising:

a pair of rollers;

means for suporting said rollers for movement of one roller towards the other roller to a normal position spaced from said other roller a distance less than the thickness of the article to be wrapped;

resilient means for moving said one roller to said normal position;

an endless belt;

means including a drum for supporting said belt for longitudinal movement along one side of said rollers;

means for moving an article and a strip to be wrapped therearound against said belt and between said rollers to the opposite side of said rollers to cause the belt to form a loop around the article and a portion of the strip and to cause the loop and the article to be supported by said rollers for rotation about an axis through the article;

means for rotating said drum to impart longitudinal movement to said belt whereby in response to movement of said belt in one direction the article and the strip are rotated within said loop to wrap the strip around the article;

a belt tightening element;

means for supporting said element for movement about the axis of said drum; and resilient means for moving said element into engagement with said belt to maintain said belt in taut condition, said belt tightening element being operable in response to movement of said belt in the reverse direction to apply tension to and hold a portion of said belt on one side of the loop against movement while the portion of said belt on the opposite side of the loop is moving to effect the withdrawal of the loop and the wrapped article from between said rollers.

5. An apparatus for cuting sections of adhesive tape and wrapping them around articles comprising:

a carrier;

holders spaced on said carrier for supporting article individually therein and each holder being provided with a surface for engaging and supporting the adhesive tape;

means for intermittently actuating said carrier to effect the engagement of said tape supporting surface and of the article in successive holders with the adhesive tape, and to advance the holders successively to a cutting station and to a wrapping station;

means at said cutting station for shearing the tape to sever a section thereof with the trailing end of the tape section supported on said tape supporting surface of said solder at the cutting station and with the leading end of the tape section supported on the article in the preceding holder;

a pair of members mounted in said wrapping station for movement of one member relative to the other;

means for urging said one member toward the other to a normal position with said members spaced apart a distance which is less than the width of the article;

a flexible belt mounted for movement along one side of said pair of members;

means at said wrapping station for moving an article with the tape adhering thereto against said belt and between said members to the opposite side of said members to cause the belt to form a loop around the article and a portion of the tape and to cause the loop and the article to be supported by said members;

means for selectively moving said belt to effect the wrapping of the strip around the article by the loop of said belt in response to movement of said belt in one direction; and means operable in response to movement of said belt in the reverse direction to effect the withdrawal of the loop and the article therein from between said members.

6. An apparatus for cutting sections of adhesive tape and wrapping them around articles comprising:
a rotary carrier;
holders spaced on said carrier for supporting articles individually therein, each holder having a surface for engaging and supporting the adhesive tape and having a first tape shearing member;
means for intermittently actuating said carrier to effect the engagement of said tape supporting surface and of the article of successive holders with an adhesive tape extending from a supply thereof, and to advance the holders to a cutting station and to a wrapping station;
a second tape shearing member at said cutting station cooperable with said first shearing member for shearing the tape to sever a section thereof with the trailing end of the section supported on said tape supporting surface of said holder at the cutting station and with the leading end of the section supported on the article in the preceding holder;
a pair of rollers mounted at said wrapping station in a normal position spaced apart a distance which is less than the width of the article and for movement of one roller away from the other;
means for urging said one roller member toward the other to said normal position;
a flexible belt mounted for movement along one side of said roller members;
means at said wrapping station for moving an article with the tape adhering thereto against said belt and between said rollers to the opposite side of said rollers to cause the belt to form a loop around the article and a portion of the tape and to cause the loop and the article to be supported by said rollers;
means for selectively moving said belt to effect the wrapping of the strip around the article by the loop of the belt in response to movement of the belt in one direction;
a belt tightening element; and
resilient means for moving said element into engagement with said belt to maintain said belt in taut condition, said belt tightening element being operable in response to movement of said belt in the reverse direction to apply tension to and yieldably hold a portion of the belt on one side of the loop against movement while the portion of said belt on the opposite side of the loop is moving to effect the withdrawal of the loop and the wrapped article from between said rollers.

7. In an article wrapping apparatus the combination of:
a flexible belt supported for longitudinal movement along a predetermined path;
a pair of members mounted adjacent to and along one side of said belt in a normal position spaced from one another a distance less than the thickness of the article to be wrapped and for lateral movement of one member from the other;
resilient means for urging said one member to said normal position;
yieldable means for maintaining said belt taut against one side of said pair of members and in a normal straight path therebetween;
means for pushing an article against said belt and between said members to cause the article with a strip adhering thereto and a portion of said belt to be carried to the opposite side of said members and a loop to be formed in said belt around the article and the strip and supported by said members for rotation about an axis through the article;
means for moving said belt longitudinally to effect the rotation of the article and the strip within said loop and the wrapping of the strip around the article; and means for effecting the movement of said one member from said other member and the ejection of the wrapped article.

8. An apparatus of the type described comprising:
a carrier;
means for guiding an adhesive tape toward said carrier;
holders spaced on said carrier for supporting articles individually therein for engagement with the adhesive side of the tape, each holder being provided with a surface for engaging the adhesive side of the tape;
means for actuating said carrier intermittently to effect the engagement of said tape supporting surface of and the article in successive holders with the adhesive tape and to advance said holders to a cutting station and to a wrapping station;
means at said cutting station for shearing the tape to sever a section thereof with the trailing end of the tape section supported on said tape engaging surface of said holder at the cutting station and with the leading end of the tape section adhering to the article in the preceding holder;
a pair of members mounted at said wrapping station for movement of one member relative to the other;
means for urging said one member toward the other to a normal position with said members spaced apart a distance less than the width of the article;
a flexible belt mounted for longitudinal movement along one side of said pair of members;
means at said wrapping station for moving an article with the tape adhering thereto from said holder against said belt and between said members to the opposite side of said members to cause said belt to form a loop around the article and a portion of the tape and to cause the loop and the article to be supported by said members for rotation about an axis through the article;
means for longitudinally moving said belt to effect the rotation of the article within said loop and the wrapping of the tape around the article; and
means for effecting the movement of said one member from said other member and the ejection of the article and said loop from between said members.

9. An apparatus of the type described comprising:
a carrier;
means for supporting a supply of adhesive tape for movement of the tape toward said carrier;
holders spaced on said carrier for supporting articles individually therein for engagement with the adhesive side of the tape, each holder being provided with a pair of laterally spaced surfaces for engaging the adhesive side of the tape and a cutting edge for shearing said tape between said surfaces;
means for actuating said carrier to effect the engagement of said tape supporting surfaces of and the article in successive holders with the adhesive tape and to advance said holders to a cutting station and to a wrapping station;
means at said cutting station cooperable with said cutting edge of said holder for shearing the tape to sever a section thereof with the trailing end of the tape section adhering to one of said tape supporting surfaces of said holder at the cutting station and with the leading end of the tape section adhering to the other tape supporting surface and to the article in the preceding holder;
a pair of rollers mounted at said wrapping station for movement of one roller relative to the other;
means for urging said one roller toward the other to a normal position with said rollers spaced apart a distance less than the width of the article;
a flexible belt mounted for longitudinal movement along one side of said pair of rollers;
means at said wrapping station for moving an article with the tape adhering thereto from said holder against said belt and between said rollers to the opposite side of said rollers to cause the belt to form a loop around the article and a portion of the tape and be supported by said rollers;

means for moving said belt longitudinally to effect the rotation of the article by said loop and the wrapping of the tape around the article; and means for effecting the separation of said rollers and the release of the article from said belt.

References Cited by the Examiner
UNITED STATES PATENTS 1,108,027 8/1914 Thorschmidt _____ 53—215
1,132,209 3/1915 Pierson _____ 53—210 X FRANK E. BAILEY, *Primary Examiner.*

TRAVIS S. McGEHEE, *Examiner.*

A. E. FOURNIER, R. L. HARRIS, *Assistant Examiners.*